(12) United States Patent
Ogawa et al.

(10) Patent No.: US 12,680,802 B2
(45) Date of Patent: Jul. 14, 2026

(54) DISPLACEMENT MEASURING INSTRUMENT

(71) Applicant: MITUTOYO CORPORATION, Kanagawa (JP)

(72) Inventors: Keita Ogawa, Kanagawa (JP); Shuji Hayashida, Kanagawa (JP); Yasuhiro Tsujimoto, Kanagawa (JP)

(73) Assignee: MITUTOYO CORPORATION, Kanagawa (JP)

( * ) Notice: Subject to any disclaimer, the term of this patent is extended or adjusted under 35 U.S.C. 154(b) by 338 days.

(21) Appl. No.: 18/591,243

(22) Filed: Feb. 29, 2024

(65) Prior Publication Data

US 2024/0328767 A1 Oct. 3, 2024

(30) Foreign Application Priority Data

Mar. 29, 2023 (JP) .................................. 2023-052784

(51) Int. Cl.
*G01B 3/00* (2006.01)
*G01B 3/24* (2006.01)

(52) U.S. Cl.
CPC ............... *G01B 3/008* (2013.01); *G01B 3/24* (2013.01)

(58) Field of Classification Search
CPC . G01B 3/008; G01B 3/24; G01B 3/18; G01B 21/02; G01D 5/244
See application file for complete search history.

(56) References Cited

U.S. PATENT DOCUMENTS

| | | | | |
|---|---|---|---|---|
| 4,736,313 | A * | 4/1988 | Nishimura ............... | G01B 3/18 |
| | | | | 33/819 |
| 6,463,671 | B1 | 10/2002 | Saeki | |
| 8,844,153 | B2 * | 9/2014 | Hayashida ............... | G01B 3/18 |
| | | | | 33/819 |
| 9,404,724 | B2 * | 8/2016 | Tsujimoto ............... | G01B 3/18 |
| 9,798,445 | B2 | 10/2017 | Niwano et al. | |
| 10,996,043 | B2 * | 5/2021 | Tsujimoto .............. | G01B 3/008 |
| 11,092,423 | B2 * | 8/2021 | Abe ....................... | G01B 5/207 |
| 2023/0304785 | A1 | 9/2023 | Ogawa et al. | |
| 2024/0035816 | A1 | 2/2024 | Ogawa et al. | |
| 2024/0328767 | A1 * | 10/2024 | Ogawa ................... | G01B 3/008 |
| 2025/0076019 | A1 * | 3/2025 | Yamaji ................... | G01B 5/06 |

FOREIGN PATENT DOCUMENTS

JP 2001-141402 A 5/2001

* cited by examiner

*Primary Examiner* — Yaritza Guadalupe-Mccall
(74) *Attorney, Agent, or Firm* — Greenblum & Bernstein, P.L.C.

(57) ABSTRACT

A displacement measuring instrument includes an encoder that detects the amount of moving displacement of a measuring element while the measuring element is in contact with the surface of an object to be measured, a calculator that calculates a measurement value, and a display that displays at least the measurement value. The calculator includes a measuring section that calculates the measurement value from the amount of moving displacement and displays the measurement value on the display, a speed acquiring section that acquires the speed of the measuring element, an approach analyzing section that analyzes and determines whether the approach of the measuring element to the object to be measured is appropriate or inappropriate, and a warning section that issues a warning when the approach analyzing section determines that the approach of the measuring element to the object to be measured is inappropriate.

4 Claims, 6 Drawing Sheets

DISPLACEMENT MEASURING INSTRUMENT

CROSS-REFERENCE TO RELATED APPLICATION

This non-provisional application claims priority under 35 U.S.C. § 119 (a) from Japanese Patent Application No. 2023-052784, filed on Mar. 29, 2023, the entire contents of which are incorporated herein by reference.

BACKGROUND OF THE INVENTION

Field of the Invention

The present invention relates to a displacement measuring instrument that measures an object to be measured based on the displacement amount of a measuring element.

Description of the Related Art

Conventionally, a displacement measuring instrument that stops a measuring element in contact with the surface of an object to be measured and calculates the position of the measuring element is known.

As an example of such a displacement measuring instrument, the micrometer described in JP 2001-141402A displaces the spindle (equivalent to a measuring element) in the axial direction by rotating the operating sleeve and measures the dimensions of the object to be measured from the displacement amount of the spindle. Specifically, the micrometer is equipped with an encoder that detects the displacement of the spindle and a digital display. The display displays the amount of the displacement of the spindle detected by the encoder on the display to inform the user of the amount of displacement.

In such a micrometer, the user's operation, for example, rotating the operating sleeve and pushing the spindle into the object to be measured even though the spindle is stopped in contact with the object to be measured, may cause variations in the measurement values obtained or damage to the object to be measured. To prevent these problems, a method of controlling the measuring force to a certain level has been adopted. For example, an operating sleeve is rotatably installed at the outer end of the spindle, and a constant pressure mechanism (such as a ratchet mechanism) is installed between the spindle and the operating sleeve. This configuration allows the micrometer to control the measuring pressure at a constant level because the constant pressure mechanism is activated, and the operating sleeve slips idly when the load on the spindle exceeds a certain level.

SUMMARY OF THE INVENTION

Problems to be Solved by the Invention

Here, where a normal micrometer has a lead pitch of 0.5 mm/rev, a micrometer with a lead pitch as large as 2 mm/rev, four times the normal pitch, moves the spindle significantly in a single revolution. In such a displacement measuring instrument where the measuring element tends to move at a relatively high speed, if the user is not familiar with the operation, he or she may cause the measuring element to move toward the object to be measured at a high speed, causing the measuring element to crash into the object to be measured. The impact generated when the measuring element crashes into the object to be measured cannot be prevented by a constant pressure mechanism such as a ratchet mechanism, causing the measuring element to bite into the object to be measured or causing variations in the measured values.

The purpose of the present invention is to provide a displacement measuring instrument that eliminates measurement values obtained by bringing the measuring element into contact with the object to be measured in an inappropriate approach and reliably obtains highly accurate measurement values.

Means for Solving the Problems

The displacement measuring instrument according to the present invention includes an encoder that detects the amount of moving displacement of a measuring element with the moving direction of the measuring element as a measuring direction while the measuring element is in contact with the surface of an object to be measured, a calculation unit that calculate a measurement value from at least the amount of moving displacement, and a display unit that display at least the measurement value. The calculating unit includes a measuring section that calculates the measurement value from the amount of moving displacement and displays the measurement value on the display unit, a speed acquiring section that acquires the speed of the measuring element, an approach analyzing section that analyzes and determines whether the approach of the measuring element to the object to be measured is appropriate or inappropriate based on the transition of the speed acquired by the speed acquiring section during a predetermined period immediately before the measuring instrument stops, and a warning section that issues a warning when the approach analyzing section determines that the approach of the measuring element to the object to be measured is inappropriate.

According to the present invention, the warning section issues a warning when the approach analysis section determines that the approach of the measuring element to the object to be measured is inappropriate so that the user can recognize that the operating method of the measuring element was not appropriate. In addition, it is possible to encourage the user to perform the measurement with proper operation. Therefore, the displacement measuring instrument can eliminate measurement values obtained by bringing the measuring element into contact with the object to be measured in an inappropriate approach and ensure that highly accurate measurements are obtained. In addition, it is possible to suppress the crashing and biting of the measuring element into the object to be measured and to reduce the variation of measurement values.

The approach analysis section preferably analyzes the speed for a predetermined period of time and determines that it is inappropriate if the change in speed during the predetermined period is not monotonous and if the speed at one or more timings immediately before the stop in the predetermined period does not fall within the predetermined range.

According to such a configuration, the approach analysis section can more accurately determine whether the approach is appropriate or inappropriate compared to the case where the approach analysis section does not analyze the speed for a predetermined period of time and determine that it is inappropriate if the change in speed during the predetermined period is not monotonous and if the speed at one or more timings immediately before the stop in the predetermined period does not fall within the predetermined range.

It is preferable that the speed acquiring section obtains the speed until the measuring element stops by calculation based on the amount of moving displacement from the encoder.

According to such a configuration, the speed acquiring section can acquire the speed by calculation based on the amount of moving displacement, so it is possible to acquire the speed without installing a speed sensor or the like. Therefore, displacement measuring instruments can reduce costs by suppressing the increase in the number of parts and damage.

It is preferable that the warning section uses the display unit to issue the warning by flashing the results of measurement by the measuring section.

According to such a configuration, the warning section can reliably inform the user of the warning because the measurement result flashes when a warning is to be reported.

DETAILED DESCRIPTION OF THE EMBODIMENTS

An embodiment of the present invention is described below based on FIGS. 1 to 6.

Figure 1:
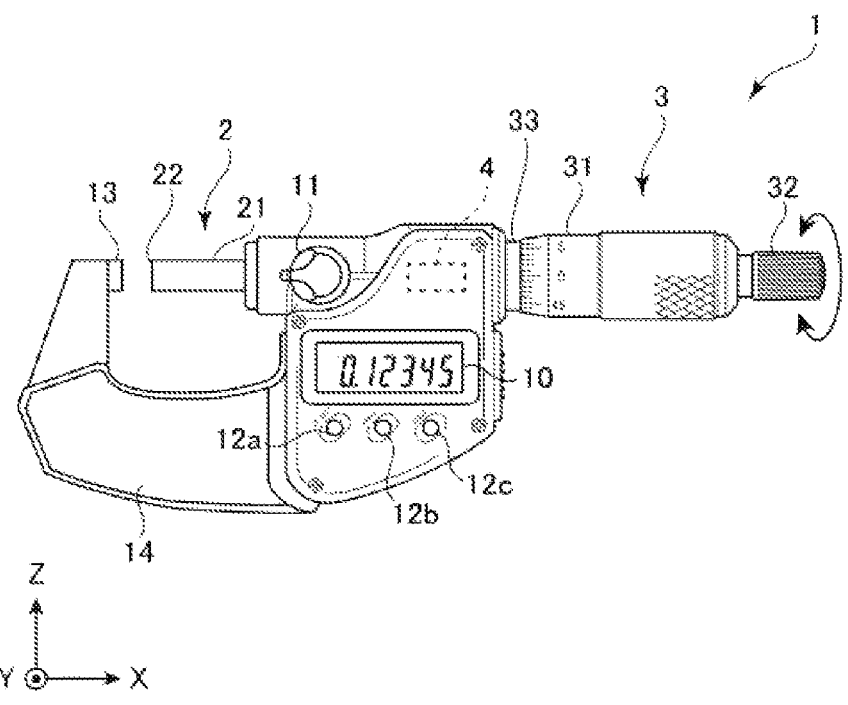
FIG. 1 is a schematic view illustrating a displacement measuring instrument according to an embodiment.

FIG. 1 is a schematic view illustrating a displacement measuring instrument 1 according to an embodiment.

As shown in FIG. 1, the displacement measuring instrument 1 is a micrometer that stops the measuring element 2 in contact with the surface of an object to be measured (not shown) and calculates a measurement value from the position of the measuring element 2 with the direction of movement being the measurement direction (X direction).

In the following description and in each drawing, the measurement direction, which is the direction of movement of the measuring element 2, is referred to as the X direction, the width direction of the displacement measuring instrument 1, which is orthogonal to the X direction, is referred to as the Y direction, and the height direction of the displacement measuring instrument 1, which is orthogonal to the X and Y directions, is referred to as the Z direction.

The displacement measuring instrument 1 includes a measuring element 2, position measuring unit 3, and calculation unit 4.

The measuring element 2 has a cylindrical spindle 21 with a contact surface 22 at one end. The contact surface 22 is a surface at the end of spindle 21 for contacting the surface of the object to be measured.

The position measuring unit 3 measures the position of the measuring element 2 relative to the reference position in the X direction, which is the measurement direction. The position measuring unit 3 has a thimble 31, a ratchet knob 32, a sleeve 33, and an encoder E (see FIG. 2). The thimble 31 and the ratchet knob 32 advance and retract spindle 21 against the object to be measured when they are rotated. The sleeve 33 is located on the opposite side of the spindle 21 from the contact surface 22. The encoder E detects the amount of moving displacement of the measuring element 2 from the reference position (e.g., the position where the contact surface 22 contacts the anvil 13 described below).

The displacement measuring instrument 1 advances and retracts the spindle 21 toward the object to be measured by rotating the thimble 31 or ratchet knob 32 in the direction of the arrow in the drawings with the spindle 21 as the axis. The displacement measuring instrument 1 measures the object to be measured from the amount of displacement of the rotation angle caused by the rotation of the thimble 31 or ratchet knob 32. The results of the measurement by the displacement measuring instrument 1, such as measurement values, are displayed on the display unit 10.

The display unit 10 consists of an LCD panel and displays at least the measurement values. The display unit 10 mainly displays measurement value and other information on a 7-segment digital display. The display unit 10 is not limited to the LCD panel, and the display unit may be organic EL (Electro-Luminescence) or electronic paper. In other words, the display unit 10 need only be able to display information about the displacement measuring instrument 1 and measurement values.

The displacement measuring instrument 1 further includes a clamp 11 for fixing the spindle 21, a plurality of button-type operating parts 12a-12c for receiving operations from the user and operating the displacement measuring instrument 1, an anvil 13, and an arm 14.

The operating part 12a is an ON/OFF button. The user turns the power of the displacement measuring instrument 1 on and off by operating the operating part 12a. The operating part 12b is a ZERO button. The user operates the operating part 12b to set the origin when starting measurement with the displacement measuring instrument 1, for example. The operating part 12c is a HOLD button. The user operates the operating part 12c, for example, when holding the value measured by the displacement measuring instrument 1. The operating parts 12a-12c may be of any configuration, even sliding, as long as they can be operated by the user. The operating parts 12a-12c may be of any function and may be located in any position as long as they can be operated by the user.

The anvil 13 is the reference position in the displacement measuring instrument 1, which is disposed opposite the contact surface 22 of the measuring element 2. The arm 14 is formed in generally U-shape. The measuring element 2 and position measuring unit 3 are located at one end of the arm 14. The anvil 13 is located at the other end of the arm 14. The displacement measuring instrument 1 clamps the object to be measured between the contact surface 22 of the measuring element 2 and the anvil 13 and measures the length from the contact surface 22 to the anvil 13. The reference position (zero) is defined as the state where the contact surface 22 of the measuring element 2 is in contact with the anvil 13. The direction in which the contact surface 22 of the measuring element 2 and the anvil 13 separate from the state of contact is the +X direction, and the direction in which the tangent surface 22 of the measuring element 2 and the anvil 13 approach from the state of separation is the −X direction. The measurement value increases as the contact surface 22 of the measuring element 2, and the anvil 13 are separated in the +X direction. The measurement value decreases as the contact surface 22 of the measuring element 2 and the anvil 13 approach each other in the −X direction.

Figure 2:
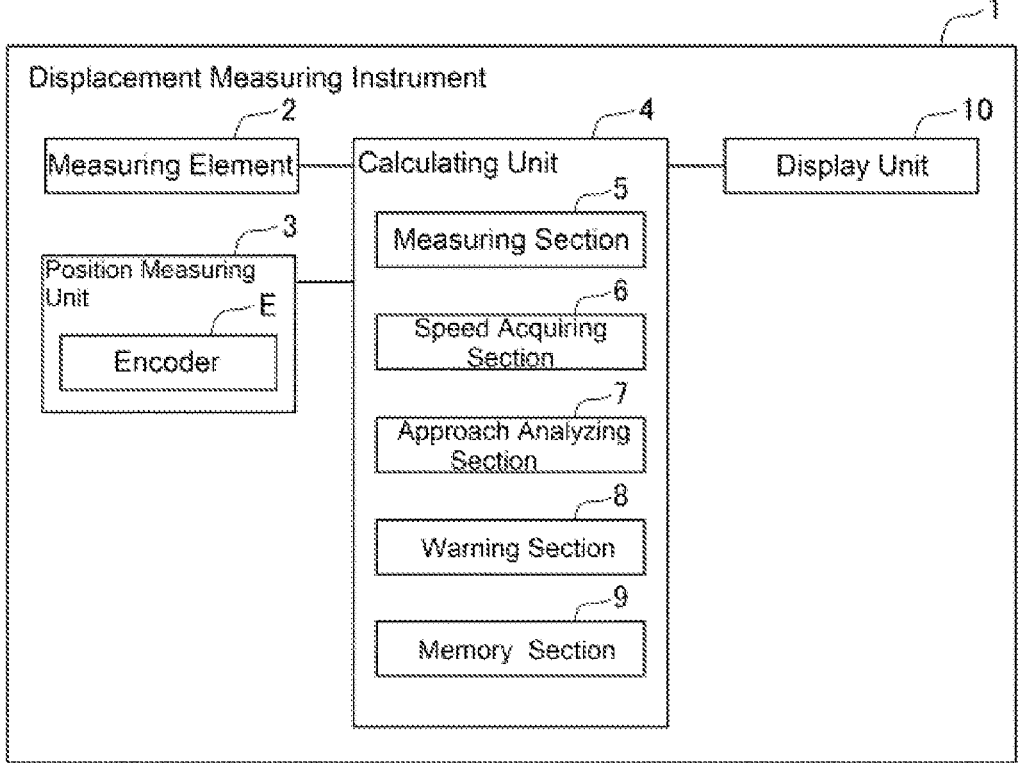
FIG. 2 is a block diagram illustrating the displacement measuring instrument.

FIG. 2 is a block diagram illustrating the displacement measuring instrument 1. As shown in FIG. 2, the displacement measuring instrument 1 includes a measuring element 2, position measuring unit 3, calculation unit 4, and display unit 10.

The calculating unit 4 includes a measuring section 5, a speed acquiring section 6, an approach analyzing section 7, a warning section 8, and a memory section 9.

The measuring section 5 calculates the measurement value from the amount of moving displacement detected by the encoder E and displays the measurement value on the display unit 10.

The speed acquiring section 6 acquires the speed of the measuring element. Specifically, the speed acquiring section 6 calculates the speed until the measuring element 2 stops by calculation based on the amount of moving displacement from the encoder E. Although the speed acquiring section 6 in the present embodiment acquires the speed by calculation, for example, the speed may be acquired by detecting it using a speed sensor.

Figure 3:
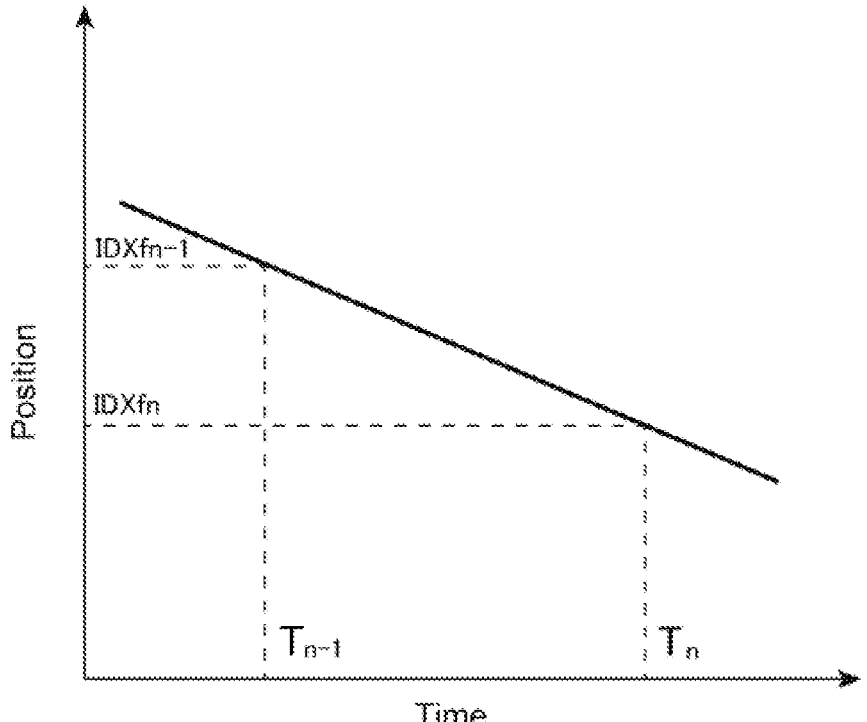
FIG. 3 shows a graph illustrating the principle of speed calculation by the speed acquiring section.

FIG. 3 shows a graph illustrating the principle of speed calculation by the speed acquiring section 6.

The speed acquiring section 6 uses the value of the counting index, which is an index to determine the rough position based on the amount of moving displacement, to obtain the speed. The counting index is a number that changes periodically according to the amount of moving displacement. For example, it takes a number from 0 to 11. By obtaining this counting index, the position of spindle 21 (measuring element 2) can be roughly determined. The speed acquiring section 6 calculates the speed by the change in this counting index per unit of time. Specifically, as shown in FIG. 3, the vertical axis is position, and the horizontal axis is time, and the speed is calculated using Equation (1) based on the counting index.

$$\text{Speed} = \frac{IDXf_n - IDXf_{n-1}}{T_n - T_{n-1}} \qquad \text{Equation (1)}$$

The speed acquiring section 6 acquires the counting index based on the amount of moving displacement at predetermined time intervals (e.g., every 6 milliseconds), calculates the speed, and stores the predetermined number of calculated speeds from the latest one in the memory section 9 provided in the calculating unit 4 while overwriting the oldest one as needed.

In the present embodiment, the latest eight of the speeds obtained by the speed acquiring section 6 are stored in the memory section 9. In other words, the oldest speeds stored in memory section 9 are overwritten with the newly acquired speeds so that the latest eight speeds are stored in memory section 9 at any time.

The memory section 9 may employ any type of memory as long as it can store speed and other data. For example, the memory section 9 may be a microcontroller or an externally connected storage device.

The approach analyzing section 7 analyzes and determines whether the approach of the measuring element 2 to the object to be measured is appropriate or inappropriate based on the predetermined threshold value and the speed acquired by the speed acquiring section 6, as shown in FIG. 2 and FIGS. 4 to 6 below. Specifically, the approach analyzing section 7 analyzes the speed for a predetermined period of time just before the measuring element 2 stops in contact with the surface of the object to be measured. If the speed changes monotonically toward the stop state (i.e., the speed is 0), the measuring element 2 is considered to have stopped without crashing into the object to be measured and is not treated as an inappropriate approach. If the change in speed is not monotonous and is within the predetermined threshold, it is considered that the measuring element 2 has stopped after an appropriate transition in speed and has come into contact with the surface of the object to be measured, and the approach to the object to be measured is determined to have been appropriate. If the change in speed is not monotonous and exceeds a predetermined threshold value, it is considered that the measuring element 2 has stopped after an inappropriate speed transition and has come into contact with the surface of the object to be measured, and the approach to the object to be measured is determined to have been abnormal (inappropriate).

As shown in FIG. 2, the warning section 8 issues a warning when the approach analyzing section 7 determines that the approach of the measuring element 2 to the object to be measured was inappropriate. Specifically, the warning section 8 uses the display unit 10 to issue the warning by flashing the measurement results by the measuring section 5. In addition, the warning section 8 restricts the functionality of the displacement measuring instrument 1. Here, restriction of functions means not displaying the measurement results on the display unit 10 or stopping the output of the measurement results if they are being output externally via communication. This restriction of functions will not be released unless the predetermined operation is performed. The predetermined operation may be an operation that moves the measuring element 2 in a direction opposite to the direction of movement before a warning is issued. It is preferable to employ the aforementioned operation as a release operation because there is a possibility that the measuring element 2 bites into the object to be measured, etc.

Figure 4:
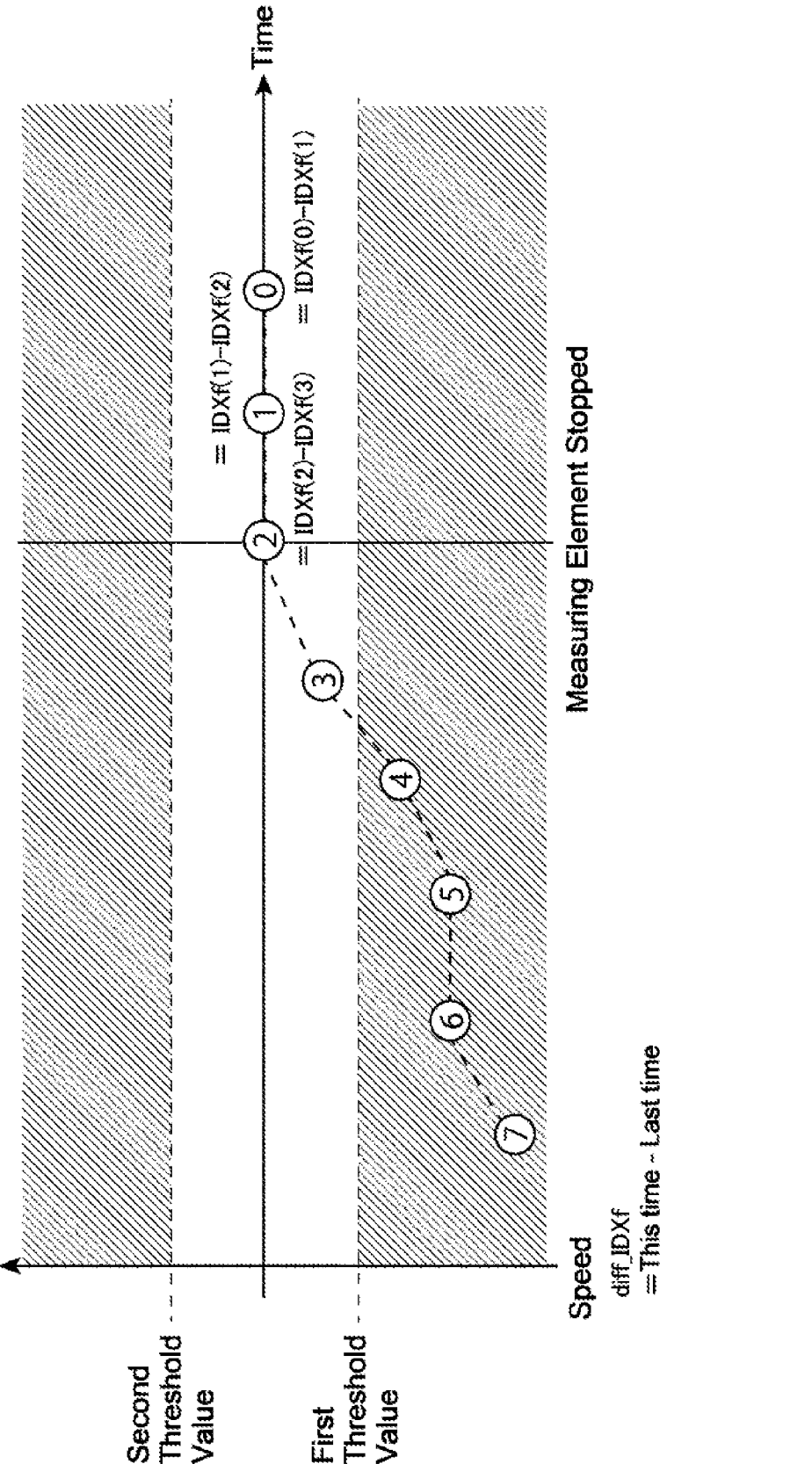
FIG. 4 shows the transition of approach speed under an appropriate condition in the displacement measuring instrument.
Figure 5:
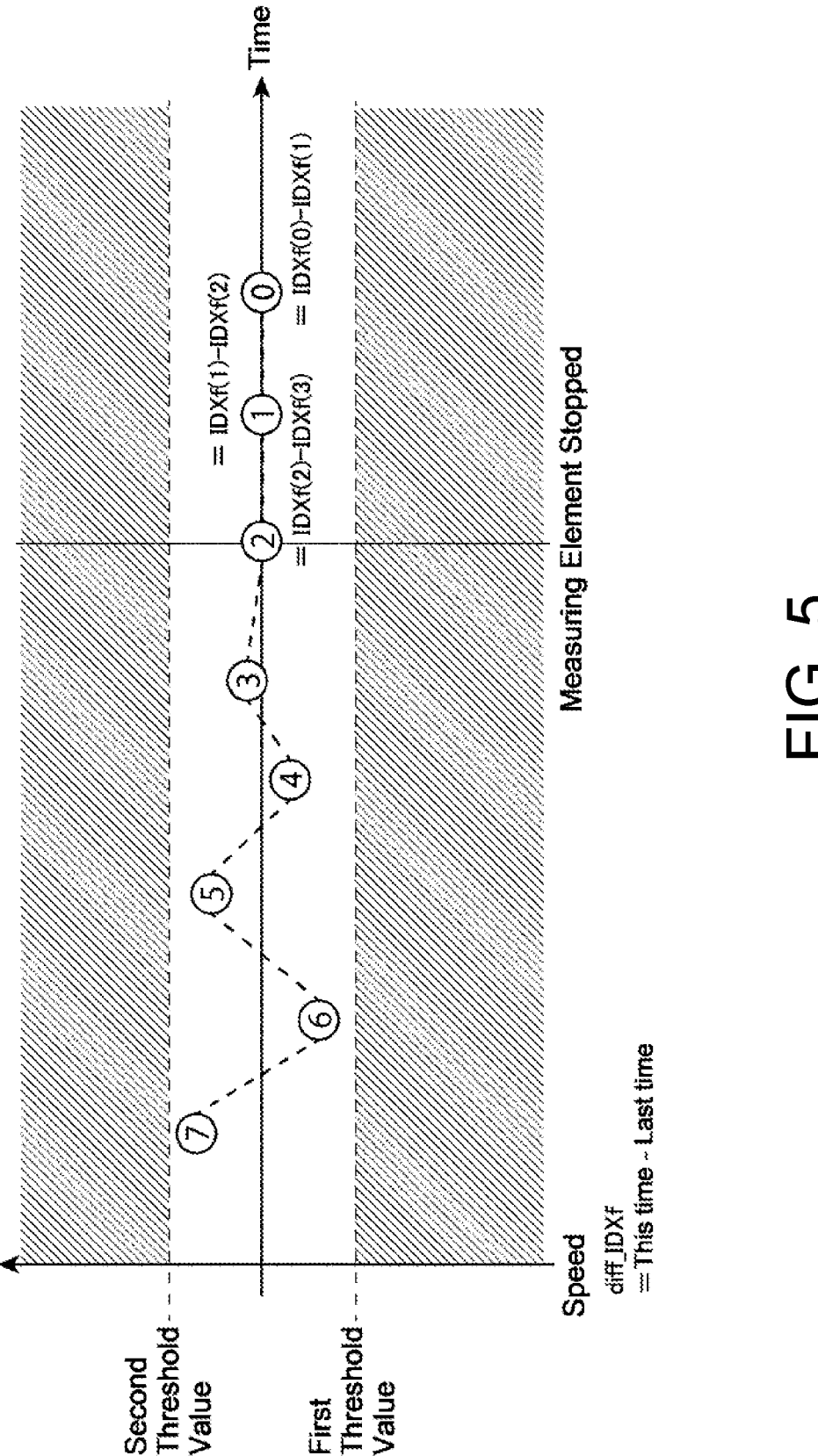
FIG. 5 shows the transition of the approach speed under another appropriate condition, which differs from FIG. 4, in the displacement measuring instrument.
Figure 6:
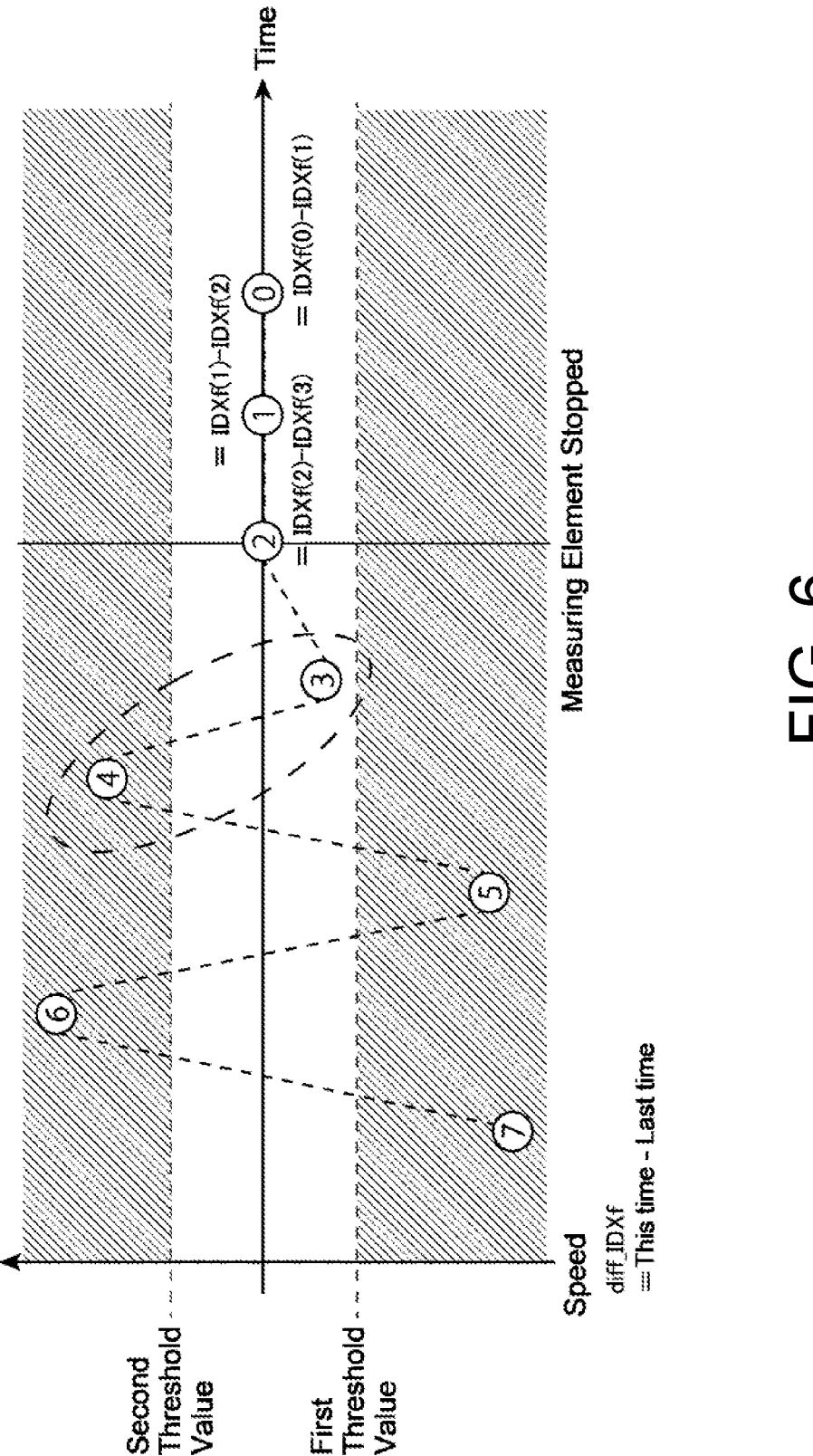
FIG. 6 shows the transition of approach speed under an inappropriate condition in the displacement measuring instrument.

FIG. 4 shows the transition of approach speed under an appropriate condition in the displacement measuring instrument 1. FIG. 5 shows the transition of the approach speed under another appropriate condition, which differs from FIG. 4, in the displacement measuring instrument 1. FIG. 6 shows the transition of approach speed under an inappropriate condition in the displacement measuring instrument 1. In FIGS. 4 to 6, respectively, the vertical axis represents velocity, and the horizontal axis represents time. In the following description, the transition of the approach speed is sometimes referred to as the "speed profile."

In the following, referring to FIGS. 4 to 6, the process by which the approach analyzing section 7 analyzes whether the approach is appropriate or inappropriate based on the transition in approach speed using the speed acquired by the speed acquiring section 6. In the drawings, the eight marks (0 to 7) indicate the speeds obtained by the speed acquiring section 6. In the following explanation, these speeds are described as speed values 0 to 7, starting from the latest one.

First, the approach analyzing section 7 considers that the measuring element 2 has stopped when the speed acquired by the speed acquiring section 6 is 0 for three consecutive times. In the examples from FIGS. 4 to 6, the speed is 0 three consecutive times from speed value 0 to speed value 2. Therefore, it is determined to have stopped at the time corresponding to speed value 2. Next, the approach analyzing section 7 considers the predetermined period immediately before the measuring element 2 stops (from the time corresponding to speed value 3 to the time corresponding to speed value 7 in the examples from FIGS. 4 to 6) as "immediately before" and analyzes the transition of speed during this period.

In FIGS. 4 to 6, when the interval at which the speed acquiring section 6 acquires speed is 6 milliseconds, 30 milliseconds is set as the predetermined period immediately before, and the five points (from speed value 3 to speed value 7) in this period are first analyzed to determine whether the change leading to the stop is monotonous. If the change leading to the stop in speed is monotonic, it can be interpreted that the measuring element 2 stopped without crashing against the surface of the object to be measured. If the change leading to the stop in speed is not monotonic, it can be interpreted that vibration occurred due to the measuring element 2 crashing against the surface of the object to be measured, etc.

As shown in FIG. 4, if the change in speed from speed value 3 to speed value 7 is monotonous, the approach analyzing section 7 determines that the measuring element has stopped without hitting the surface of the object to be measured. If the change in speed from speed value 3 to speed value 7 is not monotonous, the approach analyzing section 7 determines that the approach to the object to be measured is appropriate if the speeds of speed values 3 and 4, which are immediately before the stop, fall between the first and second threshold values. Specifically, as shown in FIG. 5, if the change in speed from speed value 3 to speed value 7 is not monotonous due to vibration, etc., but the speeds of speed values 3 and 4, especially just before stopping, fall between the first and second threshold values, the approach to the object to be measured is determined to have been appropriate.

On the other hand, as shown in FIG. 6, the approach analyzing section 7 determines that the approach to the object to be measured has been inappropriate if the change in speed from speed value 3 to speed value 7 is not monotonous, and especially if the speeds of speed values 3 and 4, which are immediately before the stop, do not fall between the first and second threshold values.

Figure 7:
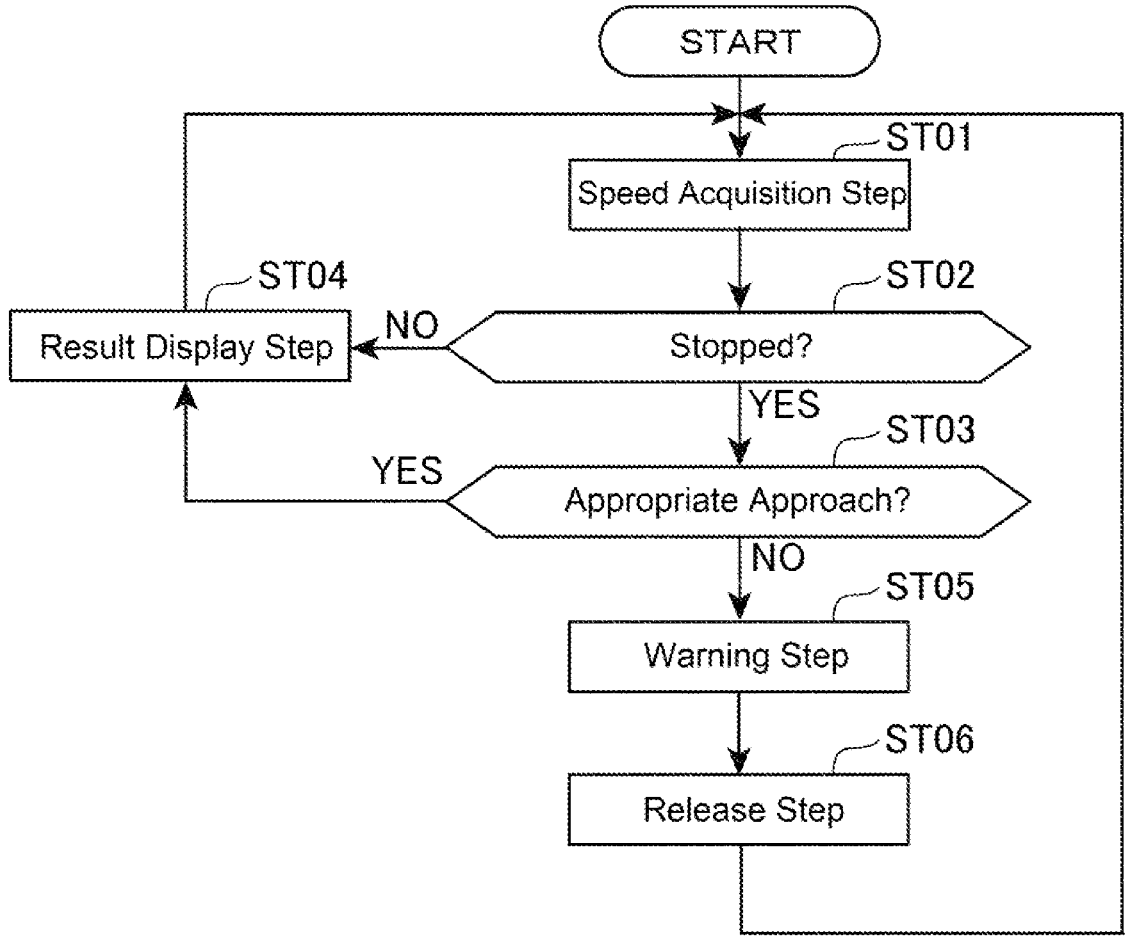
FIG. 7 is a flowchart showing the procedure in the displacement measuring instrument for determining whether the approach of the measuring element to the object to be measured is appropriate or inappropriate.

FIG. 7 shows a flowchart of the procedure in the displacement measuring instrument 1 for determining whether the approach is appropriate or inappropriate. The process of determining whether an approach is appropriate or inappropriate is described below using FIG. 7.

First, as shown in FIG. 7, the speed acquiring section 6 performs a speed acquisition step to acquire the speed until the measuring element 2 stops (step ST01). The speed acquiring section 6 acquires speeds at predetermined time intervals and overwrites and updates the latest eight speeds stored in the memory section 9 from time to time. Next, the approach analyzing section 7 performs a stop determination step to determine whether or not the measuring element 2 has stopped (step ST02). The approach analyzing section 7 determines that the measuring element 2 has stopped when the speed acquired by the speed acquiring section 6 is zero for three consecutive speeds. If the approach analyzing section 7 determines that the measuring element 2 has not stopped (NO in step ST02), it causes the measuring section 5 to perform a result display step in which the measurement results by the displacement measuring instrument 1 are displayed on the display unit 10 (step ST04) and returns to the speed acquisition step (step ST01). On the other hand, if the approach analyzing section 7 determines that the measuring element 2 has stopped (YES in step ST02), the approach analyzing section 7 determines whether the approach was appropriate or not (step ST03) based on the speed profile, which is the speed transition until the measuring element 2 stops.

If the approach analyzing section 7 determines that the approach was appropriate (YES in step ST03), it causes the measuring section 5 to perform a result display step in which the measurement results by the displacement measuring instrument 1 are displayed on the display unit 10 (step ST04) and returns to the speed acquisition step (step ST01). On the other hand, if the approach analyzing section 7 determines that the approach was inappropriate (NO in step ST03), a warning step, in which the warning is issued to the display unit 10 via the warning section 8 and the functions of the displacement measuring instrument 1 is restricted, is performed (step ST05). If the user is informed of the warning and wishes to continue measurement afterward, he/she performs a release step to release the restrictions on the functions of the displacement measuring instrument 1 by moving the measuring element 2 in the opposite direction from the direction it had been traveling (step ST06). When the release step (step ST06) is performed, the measurement becomes possible and returns to the speed acquisition step (step ST01).

According to such an embodiment, the following functions and effects can be achieved.

(1) Measurement values obtained by bringing the measuring element 2 into contact with the object to be measured with an inappropriate approach are eliminated, ensuring that highly accurate measurement values can be obtained.

(2) Since the warning section 8 issues a warning when the approach analyzing section 7 determines that the approach of the measuring element 2 to the measurement target is inappropriate, it can teach the user how to make the measuring element 2 approach the object to be measured appropriately, and the user can recognize that the operating method of the measuring element 2 was not appropriate. In addition, it is possible to encourage the user to perform the measurement with proper operation. Therefore, the displacement measuring instrument 1 can teach the user how to make the appropriate approach of the measuring element 2 to the object to be measured, prevent the measuring element 2 from crashing or biting into the object to be measured, and reduce the variation of measurement values to make measurements with higher precision.

(3) The approach analyzing section 7 analyzes the speed during a predetermined period (from speed value 3 to speed value 7 in FIGS. 4 to 6), and if the change in speed during the predetermined period is not monotonous and the speed at one or more timings (speed values 3 and 4 in FIGS. 4 to 6) immediately before the stop during the predetermined period does not fall within the predetermined range (between the first and second threshold values), the approach is determined to be inappropriate. The approach analysis section 7 can more accurately determine whether the approach is appropriate or inappropriate compared to the case where this determination step is not taken.

(4) Since the speed acquiring section 6 can acquire the speed by calculation from the amount of moving displacement, the cost can be reduced compared to installing a separate speed sensor or the like.

(5) When a warning is issued, the measurement result flashes, so the warning section 8 can ensure that the warning is reported to the user.

Modification of Embodiment

Note that the present invention is not limited to the above embodiment, and modification, improvement, and the like within the spirit and the scope of the present invention are included.

For example, in the above embodiment, displacement measuring instrument 1 was a micrometer. However, displacement measuring instruments are not limited to any particular detector type or detection method as long as the displacement measuring instrument stops the measuring element on the surface of the object to be measured and calculates a measurement value from the position of the measuring element.

In the above embodiment, the approach analyzing section 7 analyzes the speed immediately before the stop, determines that the approach is appropriate if it is monotonically decreasing without exceeding the predetermined threshold, determines that the approach is inappropriate if it is monotonically decreasing exceeding the predetermined threshold, determines that the approach is appropriate if it is not monotonically decreasing and within the predetermined threshold. However, the approach analyzing section may adopt any determination method if it can analyze and determine whether the approach of the measuring element to the object to be measured is appropriate or inappropriate based on the speed detected by the speed acquiring section during the predetermined period immediately before the measuring element stops.

In the above embodiment, the speed acquiring section 6 acquired the speed by calculation. However, the speed acquiring section may employ any acquisition method as long as it can acquire the speed of the measuring element. For example, a speed sensor could be employed.

In the above embodiment, the warning section 8 used the display unit 10 to report the warning by flashing the measurement results by the measuring section 5. However, the warning section may employ any means to report a warning when the approach analyzing section determines that the approach of the measuring element to the object to be measured is inappropriate.

For example, the warning may be reported by changing the color of the display screen of the display unit, by changing the color of the text to be displayed, or by sounding a buzzer or other sound. The warning may also be reported by stimulating the human body in contact with the displacement measuring instrument or by generating vibration. In addition, warnings may be reported using light, such as by lighting or flickering a light-emitting component such as an LED, or by modifying the light intensity of the backlight of the display screen.

INDUSTRIAL APPLICABILITY

As described above, the present invention can be suitably used for the displacement measuring instrument.

What is claimed is:

1. A displacement measuring instrument comprising an encoder that detects an amount of moving displacement of a measuring element with the moving direction of the measuring element as a measuring direction while the measuring element is in contact with the surface of an object to be measured, a calculation unit that calculates a measurement value from at least the amount of moving displacement, and a display unit that displays at least the measurement value, wherein the calculating unit comprises:

a measuring section that calculates the measurement value from the amount of moving displacement and displays the measurement value on the display unit;

a speed acquiring section that acquires the speed of the measuring element;

an approach analyzing section that analyzes and determines whether the approach of the measuring element to the object to be measured is appropriate or inappropriate based on the transition of the speed acquired by the speed acquiring section during a predetermined period immediately before the measuring instrument stops; and a warning section that issues a warning when the approach analyzing section determines that the approach of the measuring element to the object to be measured is inappropriate.

2. The displacement measuring instrument according to claim 1, wherein the approach analysis section analyzes the speed for a predetermined period of time and determines that it is inappropriate if the change in speed during the predetermined period is not monotonous and if the speed at one or more timings immediately before the stop in the predetermined period does not fall within the predetermined range.

3. The displacement measuring instrument according to claim 1, wherein the speed acquiring section obtains the speed until the measuring element stops by calculation based on the amount of moving displacement from the encoder.

4. The displacement measuring instrument according to claim 1, wherein the warning section uses the display unit to issue the warning by flashing the results of measurement by the measuring section.

* * * * *